United States Patent [19]
Dean et al.

[11] Patent Number: 6,055,512
[45] Date of Patent: Apr. 25, 2000

[54] NETWORKED PERSONAL CUSTOMIZED INFORMATION AND FACILITY SERVICES

[75] Inventors: Robert John Dean; Brian Michael Unitt; Yashvant Kanabar, all of Bishops Stortford, United Kingdom; Daniel Vincent McCaughan, Hollywood, Ireland

[73] Assignee: Nortel Networks Corporation, Montreal, Canada

[21] Appl. No.: 08/889,602

[22] Filed: Jul. 8, 1997

[51] Int. Cl.[7] .................................................. G06F 17/60
[52] U.S. Cl. ................ 705/17; 395/200.31; 395/200.32; 395/200.47; 395/200.48; 705/26; 705/27
[58] Field of Search .................................. 705/1, 17, 26, 705/27; 395/200.31, 200.32, 200.47, 200.48

[56] References Cited

U.S. PATENT DOCUMENTS

| | | | |
|---|---|---|---|
| 3,555,196 | 1/1971 | Singer | 379/207 |
| 3,771,139 | 11/1973 | Digby | 711/108 |
| 4,202,041 | 5/1980 | Kaplow et al. | 341/26 |
| 4,707,853 | 11/1987 | Hasegawa | 379/221 |
| 4,763,354 | 8/1988 | Fukushima et al. | 379/165 |
| 4,765,666 | 8/1988 | Bergeron | 463/25 |
| 4,935,956 | 6/1990 | Hellwarth et al. | 379/112 |
| 5,048,085 | 9/1991 | Abraham et al. | 380/25 |
| 5,065,429 | 11/1991 | Lang | 380/25 |
| 5,148,481 | 9/1992 | Abraham et al. | 380/46 |
| 5,195,130 | 3/1993 | Weiss et al. | 379/93.13 |
| 5,231,634 | 7/1993 | Giles et al. | 370/348 |
| 5,339,239 | 8/1994 | Manabe et al. | 705/1 |
| 5,422,953 | 6/1995 | Fischer | 380/23 |

(List continued on next page.)

FOREIGN PATENT DOCUMENTS

| | | | |
|---|---|---|---|
| 0 810 538 | 3/1997 | European Pat. Off. | |
| 2638002 | of 1988 | France | G06K 19/073 |
| 4213797A1 | 10/1993 | Germany | G06K 19/06 |
| 62-113267 | 5/1987 | Japan . | |
| 5-89302 | 4/1993 | Japan . | |
| 5089302 | 4/1993 | Japan . | |
| 2289598 | 11/1995 | United Kingdom | G06F 9/46 |
| WO 92/09955 | 6/1992 | WIPO | G06F 13/10 |
| WO 96/17476 | 6/1996 | WIPO | H04N 7/173 |

OTHER PUBLICATIONS

Balch, Karen, Varbusiness, No. 815, 86, "It's in the Cards.", Oct. 1, 1992.
McKie, Stewart, DBMS, vol. 9, No. 7, p. 42, "The Informix Enterprise Strategy.", Jun. 1996.
AT&T Direct Service, 108–17, AT&T May 1996.
AT&T Enhanced Customer Services, COL Jul. 1996.

*Primary Examiner*—James P. Trammell
*Assistant Examiner*—Nicholas David Rosen
*Attorney, Agent, or Firm*—Lee, Mann, Smith, McWilliams, Sweeney & Ohlson

[57] ABSTRACT

A service terminal facility is provided at a public access location, for example in a hotel, hospital or airport, the service terminal facility available for providing electronic information services to users, in response to input of a portable data storage medium, for example a smart card or the like. A smart card contains stored data describing user specified information such as contacts names, personal details and medical information and personal interest information. The service terminal comprises a search engine for searching the user data and comparing data types within the user data with general data stored locally at the service terminal. The service terminal selects data corresponding to data types specified in the user data and displays these on the graphical user interface at the service terminal, or at a user interface connected with the service terminal. The user data may specify one or more data sources or service providers from which electronic data services of interest to the user can be obtained. The service terminal may obtain listings of data from remote data sources and/or service providers and display these on the graphical user interface and/or user interface. The user may instruct downloading of electronic data or electronic information services from remote data sources or service providers from the service terminal for delivery to the graphical user interface or the user interface.

7 Claims, 10 Drawing Sheets

U.S. PATENT DOCUMENTS

| | | | |
|---|---|---|---|
| 5,497,411 | 3/1996 | Pellerin | 455/411 |
| 5,530,961 | 6/1996 | Janay et al. | 345/334 |
| 5,532,463 | 7/1996 | Debelleix et al. | 424/473 |
| 5,557,518 | 9/1996 | Rosen | 380/24 |
| 5,572,572 | 11/1996 | Kawan et al. | 379/90.01 |
| 5,576,951 | 11/1996 | Lockwood | 705/27 |
| 5,655,012 | 8/1997 | Tsuchida et al. | 379/178 |
| 5,682,525 | 10/1997 | Bouve et al. | 707/104 |
| 5,699,526 | 12/1997 | Siefert | 705/27 |
| 5,710,884 | 1/1998 | Dedrick | 395/200.47 |
| 5,764,639 | 6/1998 | Staples et al. | 370/401 |
| 5,873,076 | 2/1999 | Barr et al. | 707/3 |
| 5,878,142 | 3/1999 | Caputo et al. | 380/25 |
| 5,884,271 | 3/1999 | Pitroda | 705/1 |

User Data

| Personal | Leisure | Contacts | Other |
|---|---|---|---|
| Name | Sports | Wife | Stocks |
| Address | TV Preference | Secretary | Bonds |
| Date of Birth | Theatre | Employer | |
| Citizenship | | Supplier 1 | |
| | | Supplier 2 | |
| | | Supplier 3 | |
| | | Supplier 4 | |
| | | Supplier 5 | |
| | | Associate 1 | |
| | | Associate 2 | |
| | | Associate 3 | |
| | | Associate 4 | |
| | | Associate 5 | |

| Medical | Business |
|---|---|
| Blood Group | Corporate Phone No |
| Next of Kin | Corporate Fax No |
| Disabilities | Corporate E-mail |

| Dietary |
|---|
| Chinese |
| Indian |
| Vegetarian |

| Remote Access Data |
|---|
| Website 1 |
| Database 1 key details |
| Database 2 key details |

Fig. 3

| User identifier | Room no | Input user data | User specific retrieval data | Data services/ service provider | General data |
|---|---|---|---|---|---|
| User 1 | 1 | Data 1 | Retrieved data 1 | Data source 1<br>- address<br>- data type | Travel<br>- timetables<br>- phone numbers |
| User 2 | 2 | Data 2 | Retrieved data 1 | Data source 2<br>- address<br>- data type | Leisure<br>- shopping<br>- sport<br>- theatre |
| User 3 | 28 | Data 3 | Retrieved data 1 | — | Eating Out<br>- restaurants<br>- pubs |
| — | — | — | — | — | |
| User N | 12 | Data N | Retrieved data N | Data source X<br>- address<br>- data type | |

Fig. 4

NETWORKED PERSONAL CUSTOMIZED INFORMATION AND FACILITY SERVICES

FIELD OF THE INVENTION

The present invention relates to an electronic information service facility for providing personalized electronic services.

BACKGROUND TO THE INVENTION

Various convenience services are available to travelers, particularly business travelers, when staying at hotels, conference centers, airport departure lounges and the like. Such services are intended to enable improved convenience to travelers when away from home or away from their work base, and are used by hotel groups, conference groups, etc as a service differentiator to attract corporate customers to stay in their hotels or attend their conference centers.

One example of a conventional service offered by hotels is the Direct® Service of AT&T Corporation. In the AT&T Direct Service system, users are issued with a swipe card, similar to a credit card, which can be used outside the US to access the AT&T communications network by lifting a telephone handset and dialing *60 or some other AT&T direct access number as listed on a wallet sized directory card provided with the service. Once connected to the AT&T communications network, users have access to toll-free numbers (0800 numbers), can set up conference calls, and can access other services such as language interpreters or recording and delivering messages through the AT&T True Messages® service. Once connected to the AT&T telecommunications network, users may also access a 24 hour English speaking operator service. The conventional AT&T Direct Service system has an advantage of providing added value service to telephone users, whilst encouraging users to use AT&T telecommunications networks.

Other examples of convenience services provided in hotels are conventional hotel television systems. For example the Philips "Hotel TV" comprises a central control apparatus as may be situated at hotel reception and a plurality of television monitors distributed around the building, each television monitor being provided with a conventional remote control apparatus. A user of the hotel information system is presented with a menu display on the television screen, from which items may be selected using an electronic cursor controlled from a hand-held remote control device. For example, a typical list of available services on the Philips "Hotel TV" system includes guest services; a message service; wake-up call service; television and radio service; pay movie guide;

viewing of the guest's bill; and hotel information. To access the pay TV service, view a bill, or view messages, a user must enter a security code using the TV remote control handset. The user is supplied with the security code on checking into the hotel. The conventional hotel television system may be personalized at an elementary level by including a guest's name, which may be displayed on a TV monitor within the guest's room in the form of a message such as "Welcome to<Town>, <Guest Name>"
where the guest's name is entered into the system by hotel staff.

A third example of a service offered by hotels, airlines, etc provides a rudimentary form of customization of customer details by monitoring usage and behavior patterns of customers through the use of "guest" clubs and loyalty card schemes involving cards having magnetic stripes. Such schemes require filling in questionnaire forms, however customers are often reluctant to fill in questionnaire forms, and there is a burden in collecting and gathering questionnaire forms with a result that customer information is irregularly and infrequently updated. A customer has no access to information held on a database storing information collected from a questionnaire and has no direct involvement or control in extending or limiting the scope of services offered by the service provider.

SUMMARY OF THE INVENTION

One object of specific methods and embodiments according to the present invention is to provide a customized set of electronic services to a user at a public access location, for example a hotel, conference center, hospital or airport lounge.

According to one aspect of the present invention there is provided a service apparatus capable of providing personalized electronic data services specific to a user, said service apparatus comprising:

at least one portable data storage means capable of specifying user specific data describing a set of data types;

data input means for receiving said user specific data;

data storage means for storing data describing a plurality of said electronic data services;

means for selecting at least one said electronic data service, said selection being made in accordance with said user specific data by comparing said user specific data with said data describing electronic data services; and means for controlling delivery of said selected electronic data services.

Said portable data storage means may carry said user specific data, and may download said user specific data into said data input means, Alternately, said portable data storage means may store a set of remote access data comprising data specifying addresses of remote data sources from which said user specific data may be obtained, together with data which may be required to access said remotely stored user specific data.

Preferably, said means for controlling delivery of electronic data services is capable of controlling at least one user interface.

Said means for controlling delivery of electronic data may comprise means for controlling a private branch exchange apparatus. Where a private branch exchange apparatus is provided, said private branch exchange apparatus is preferably configurable in response to control signals generated by said control means, in response to said user specific data, to store a plurality of abbreviated dial numbers.

Suitably, said portable data storage means comprises a smart card. Preferably said data input means comprises a smart card reader port.

Preferably, said means for selecting electronic data services comprises a processor operating in accordance with a search algorithm, said algorithm operating to compare said user data with said stored data describing said plurality of electronic data services.

Preferably, said means for controlling delivery of selected electronic data services comprises interface means capable of communicating with a plurality of remote data sources.

According to a second aspect of the present invention, there is provided, in a service terminal capable of providing electronic data services, a method of customizing said data services in accordance with a set of user specified data types, said method comprising the steps of:

receiving user data describing a set of said user specified data types;

identifying said user specified data types within said user data;

searching stored data for data items corresponding to said identified data types;

retrieving said data items from said stored data; and displaying said identified data items.

According to a third aspect of the present invention, there is provided in a service terminal capable of providing electronic data services, a method of customizing said data services in accordance with a set of user specified data types, said method comprising the steps of:

receiving user data describing a set of said user specified data types;

identifying said user specified data types within said user data;

searching stored data for data describing electronic data services corresponding to said identified user specified data types;

retrieving said electronic data services; and delivering said identified electronic data services.

Preferably, said electronic data services are delivered to at least one user interface.

Preferably, said step of retrieving data services comprises obtaining data from at least one remote service provider source. Said data may be selected from a set including: data describing travel timetable information; data describing sports events; data describing leisure activities.

According to a fourth aspect of the present invention, there is provided in a service terminal capable of providing electronic data services, a method of customizing said electronic data services including the steps of:

receiving user data describing a predetermined set of data types; said data types relating to a selection of personalized information;

configuring one or a plurality of service terminal devices to supply personalized electronic data service corresponding to said data types.

Said step of configuring a service terminal may comprise configuring a telecommunications apparatus with a set of abbreviated dialing codes.

Personalized electronic data services may include theater and cinema booking services and information, train/aircraft timetabling and booking services, business support services, eg Yellow Pages, Internet services, television program or cable TV program services, fax and e-mail services.

Said step of configuring a telecommunications apparatus may comprise configuring a private branch exchange apparatus to connect international dialed calls to a local corporate network number, said local corporate network number specified in said user data.

The local PBX may be configured to route international calls to a local access point of a corporate network, thereby incurring local call charges or international calls, by making use of the local access point to the corporate network. The corporate network could include an intranet.

Said step of receiving user data may comprise the steps of: downloading a set of remote access data describing a location of a data source from which said user specific data is accessible; and communicating with said data source for retrieval of said user specific data.

Said step of receiving user data may comprise the step of communicating between said service terminal and said user data source using an encryption algorithm.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 3 illustrates an arrangement of data stored in a portable data storage medium used to access the service terminal facility of FIG. 1 herein;

FIG. 4 illustrates an arrangement of data and a relationship between data items resident in a database of the service terminal facility of FIG. 1 herein;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
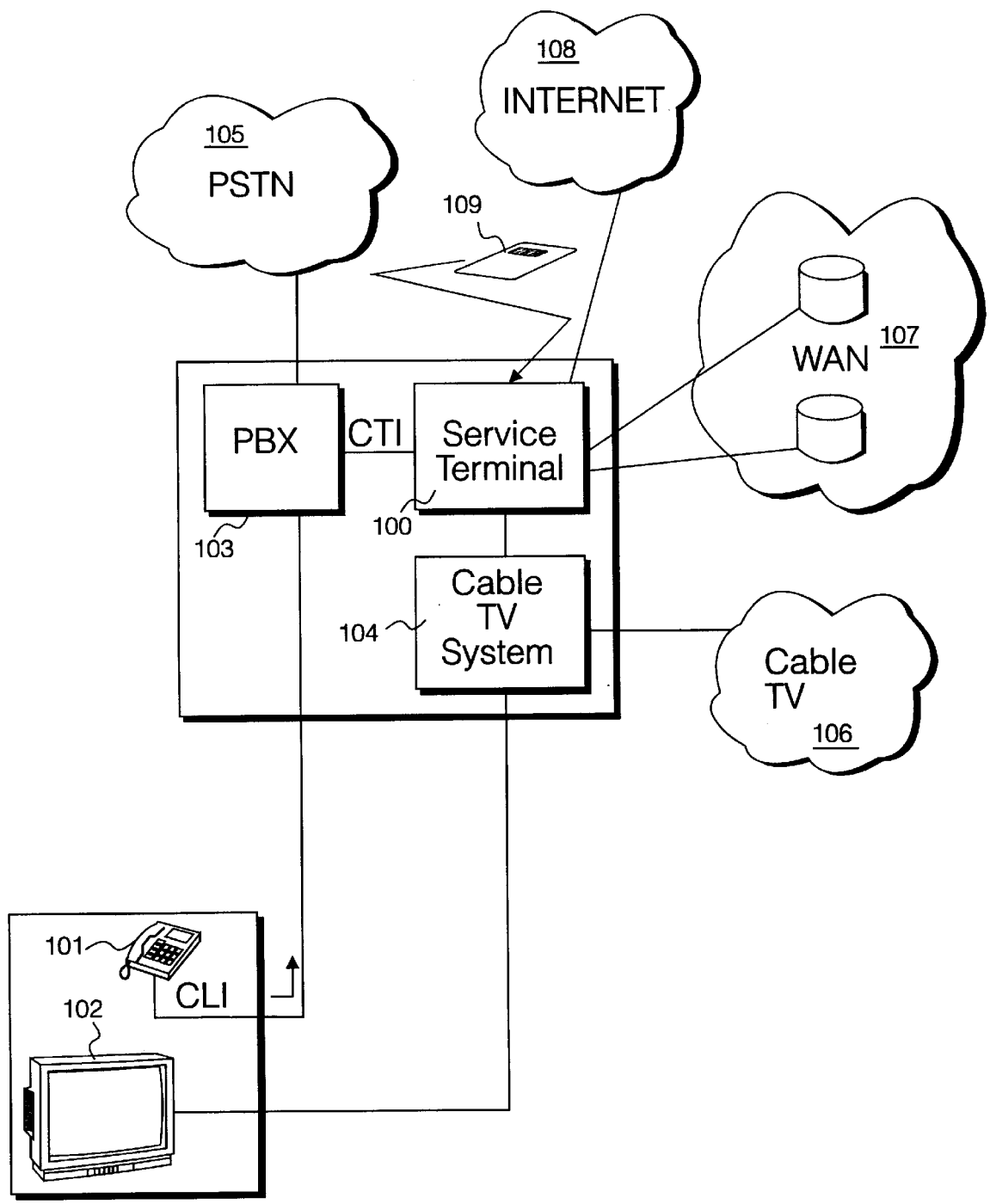
FIG. 1 illustrates a service terminal facility capable of providing personalized electronic information services to a user.

Referring to FIG. 1 herein, there is illustrated a service terminal facility for providing electronic information services to a user, in response to an input of user specific data down loaded from a portable data storage means. Such electronic information services may include types of data which are deliverable electronically as electronic data signals. The following list contains examples of such information services:

cable TV programs, satellite TV programs, terrestrial TV programs

Teletext services internet services, including E-mail fax and telecommunications services hotel/hospital/airport information The service terminal facility comprises a service terminal device 100; a plurality of user interfaces for example telephone handsets 101, and video monitors 102; and a plurality of gateway devices for example private branch exchange apparatus 103, and cable TV access device 104. The gateway devices connect to appropriate corresponding remote data sources such as may be available through a public switched telephone network 105, or a cable TV network 106 from which electronic data and/or electronic services are obtained, a satellite TV Terminal, or an on-line service provider service apparatus, for example such as provided by Compuserve ®. The service terminal device may connect directly to individual data sources, for example via a wide area network 107, or the internet 108. Typically the service terminal 100 may be provided in a public access location, eg a hotel reception or hospital reception area, whereas the user interfaces may be provided in restricted locations, such as a hotel room or a hospital room. The portable data storage means 109 suitably comprises a smart card pre-loaded with the user specific data or with remote access data describing remote locations at which user specific data is stored, together with any passwords, keywords or encryption data enabling access to that remotely stored user specific data, and is of a size and shape such as can be carried conveniently by a user in a wallet or purse and uses smart card technology which is conventional in the art.

Figure 2:
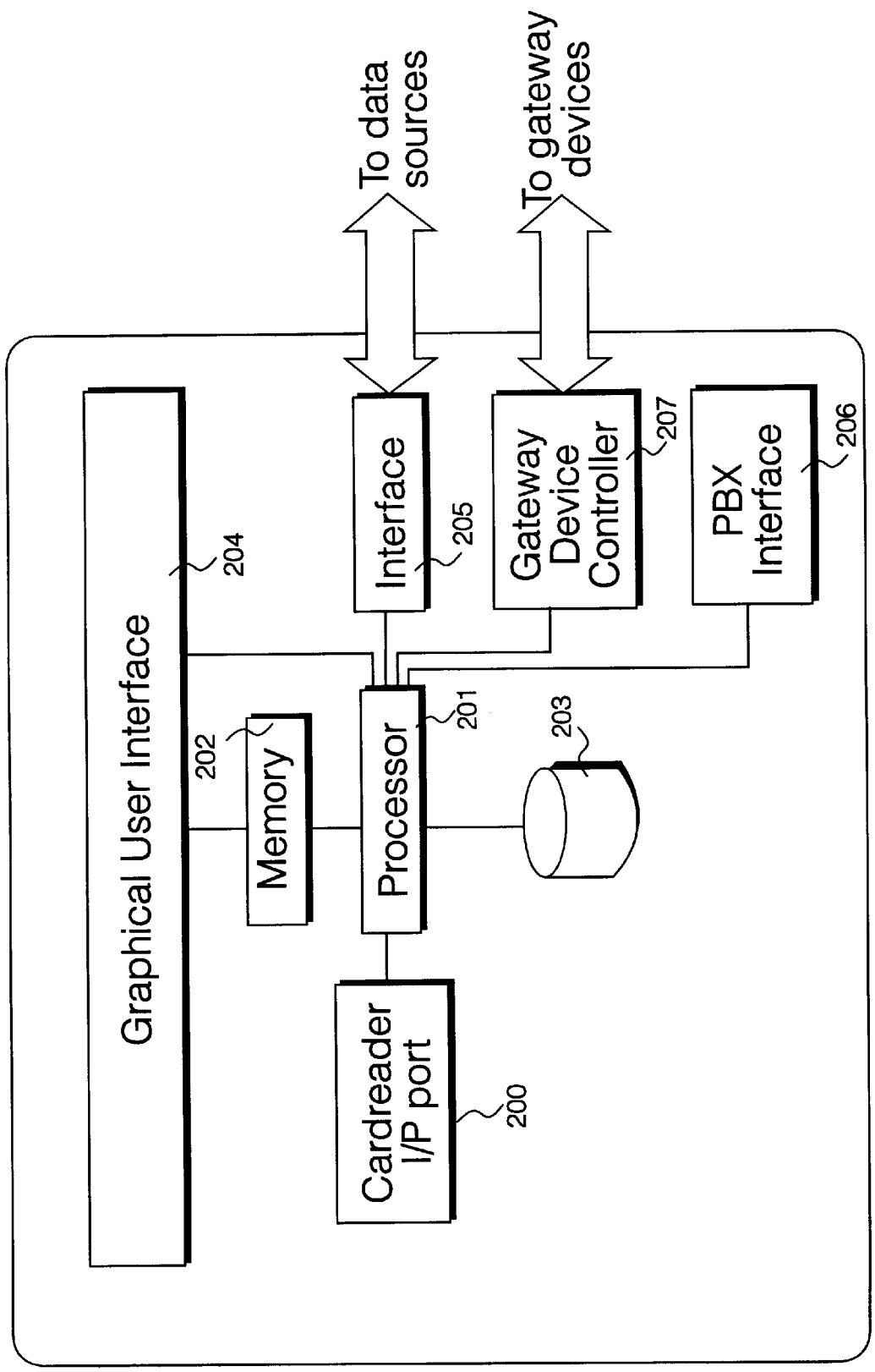
FIG. 2 illustrates an internal architecture of a service terminal device comprising the service terminal facility of FIG. 1.

Referring to FIG. 2 herein, the service terminal device 100 comprises a card reader data input port 200; a processor 201, with associated memory 202; a data storage means 203 storing data base information; a graphical user interface 204 for inputting instructions and monitoring services and data provided by the facility; and an interface 205 for communicating directly with a plurality of data sources and service providers. Access to the public switched telephone network is made via local private branch exchange apparatus 103 connected to the service terminal by a conventional CTI interface 206. Control of gateway devices is made by the service terminal via gateway device controller interface 207.

The following description relates to an example of installation of a service terminal facility in a hotel environment, but it will be appreciated by those skilled in the art that the service terminal facility is not restricted to such installations, but finds wider application and the features described are generic to a wide range of installations. One mode of operation of the first specific embodiment service terminal facility is as follows:

A user staying at a hotel, conference center or the like provided with the service terminal facility presents his or her portable storage device, eg smart card on check in. The smart card is input into card reader data input port 200 of the service terminal 100, which downloads user specific data which is predetermined by the user, and pre-stored on the smart card. User specific data is categorized into different data types. Individual data items are personal to the user. User specific data may describe information selected from the following set:

data concerning dietary preferences data concerning personal television viewing preferences data concerning wake-up call preference time data describing leisure activity preferences data describing personal medical information, eg kidney donor, blood group, diabetic problems, disabilities data describing emergency contact numbers, eg spouse or office data describing contact information, eg telephone numbers of corporate network to which the user may have access, and directing of personally selected telephone numbers.

An example of data types stored on smart card 109 is illustrated in FIG. 3 herein.

The user specific data is categorized into data types, such as personal, medical, dietary, leisure, business and address book. Data entries in each category may include data such as internet addresses, telephone numbers or address details, eg worldwide web addresses of data sources from which data services may be obtained for the data type specified in the user data.

The personalized user specific data is downloaded into a database and stored in an area of the database which is related to the users name, or a room number in which the user is staying.

Alternatively, to the personal data types being stored on the smart card, there may be stored a remote access data describing a set of addresses, file names and access details for retrieving user specific data stored on one or more remote data sources. In this case, rather than the service terminal downloading the user specific data from the smart card, the service terminal downloads location data describing one or more address locations of a data source on which the user specific data is stored.

Referring to FIG. 4 herein, an example of a layout of stored data in a database 400 is illustrated. Each user is identified by a user reference number or other identification code, in an area of memory of the database which may be part of the user specific data downloaded from the card, or may be input at a data entry device of service terminal 100. The reference number/identification code data identifies the user. The processor 201 operates an algorithm which reads the user data on the smart card, and stores the user data in database 400, and operates another algorithm which relates the locally stored user data to a set of user interfaces, eg the user interfaces provided in the user's room. Each user is allocated his or her own area of database, in data storage means 203, and is allocated his of her own user interface, which corresponds to a location in which the user is staying. Typically a room number in which the user is staying is typed in via graphical user interface 204. The user data specifies personal preferences or other information as described above in the form of data types. The database stores user data of a plurality of users, the user data of each user being protected and inaccessible to other users. The database also stores a set of service data comprising a list of electronic addresses or dial-up numbers of remote data sources and service providers, together with data which identifies the type of data and services available for retrieval from those data sources and service providers. In a general data area of database 400, there is stored locally a set of general data describing categories of general information, such as leisure interests, travel arrangements, local restaurants, which is accessible to all users of the service terminal facility. The processor operates a set of search and display algorithms which, for each set of user data input to the service terminal, searches the user data for predetermined data types indicating personal preferences of information, searches the locally stored data for service data items which correspond to the identified data types, such as data describing services available from remote data sources and service providers to find data services which match the data types identified in the user data, retrieves data items from the locally stored data and displays retrieved data items and data describing available services on a user interface of the user, the selection of data items and data describing services being determined by the data types identified in the user data. For each set of user data input to the service terminal, the service terminal operates to read the input user data, compare the input user data with the data which identifies pre-determined data sources and service providers, and identifies data sources and service providers from which electronic data services can be obtained, corresponding to the preferences specified in the user data input from smart card 109. Similarly, the user data is compared with the categories of locally stored general information data, and general data items corresponding to user specified preferences indicated in the downloaded user data. Items of data from the general data may be directed to the appropriate user interfaces for display, for example on a scroll type display in which data items are continuously scrolled over a TV monitor, or other display, in which headings of information categories are displayed. Data corresponding to specified user preference data types retrieved from the general area of database 400 are sent to a display terminal, for example TV monitor 107 in the user's hotel room, for display.

Figure 5:
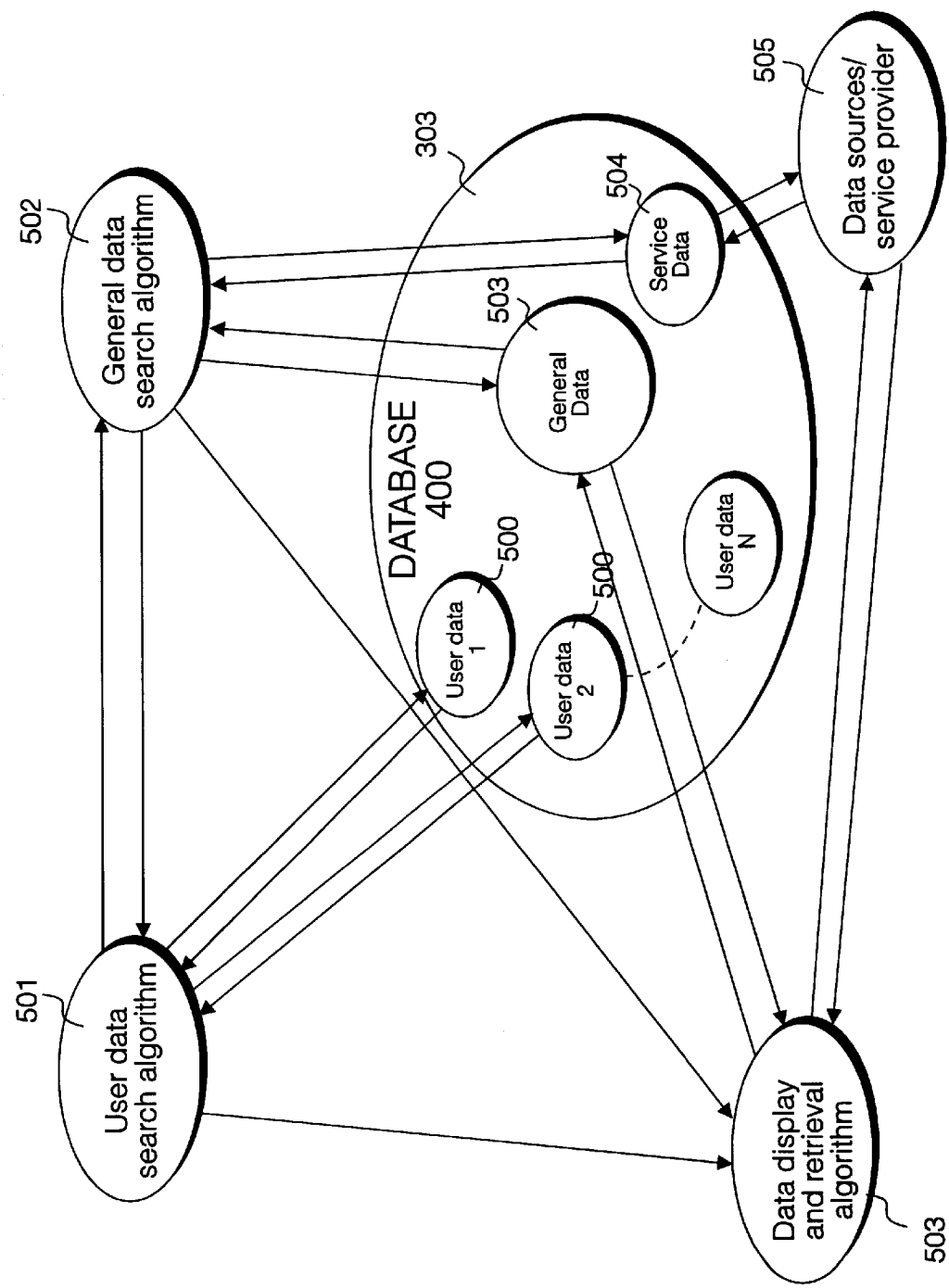
FIG. 5 illustrates a data flow diagram between data resident in the database, and a set of algorithms operated by the service terminal device.
Figure 6:
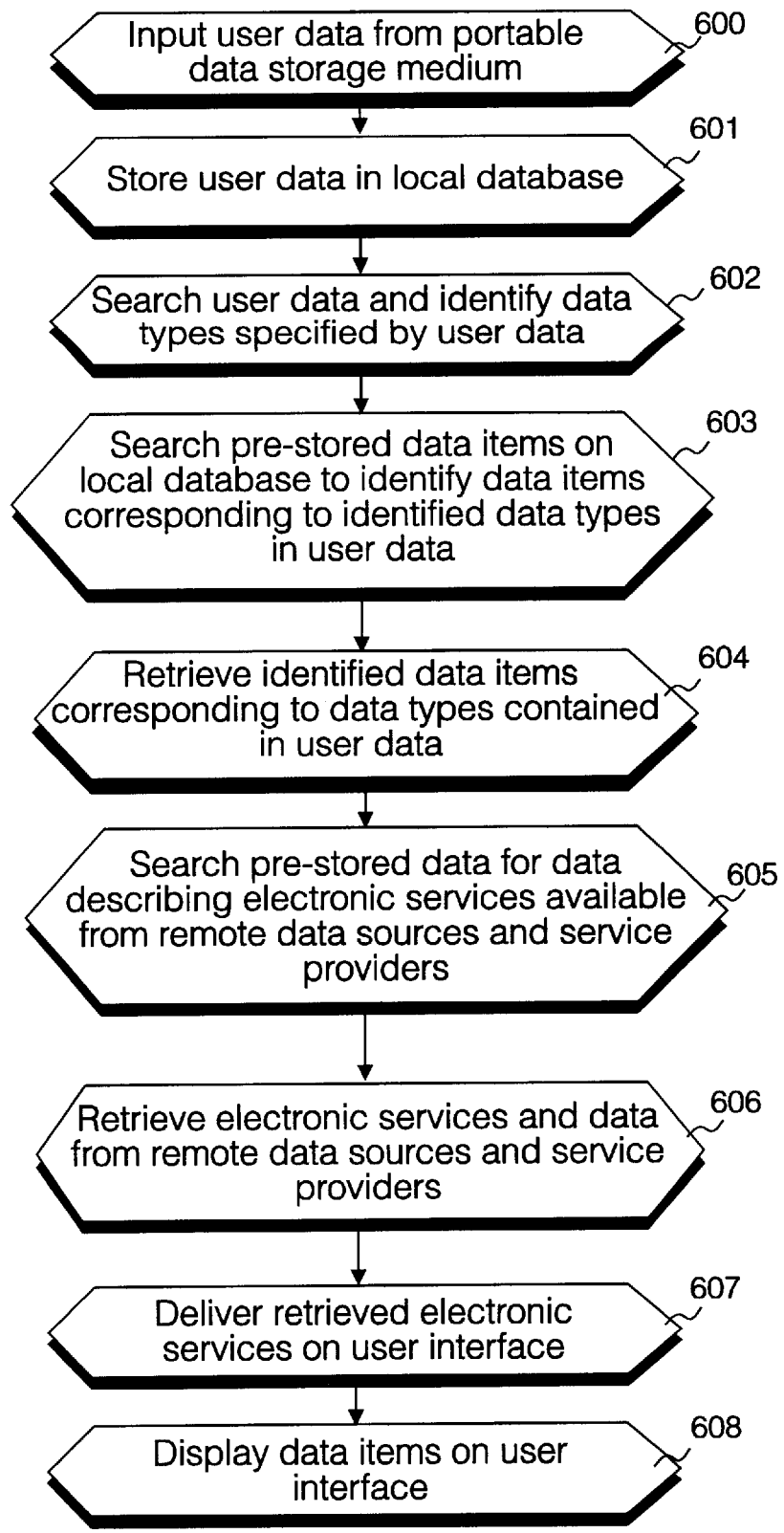
FIG. 6 herein illustrates a general method of operation of the service terminal facility.
Figure 7:
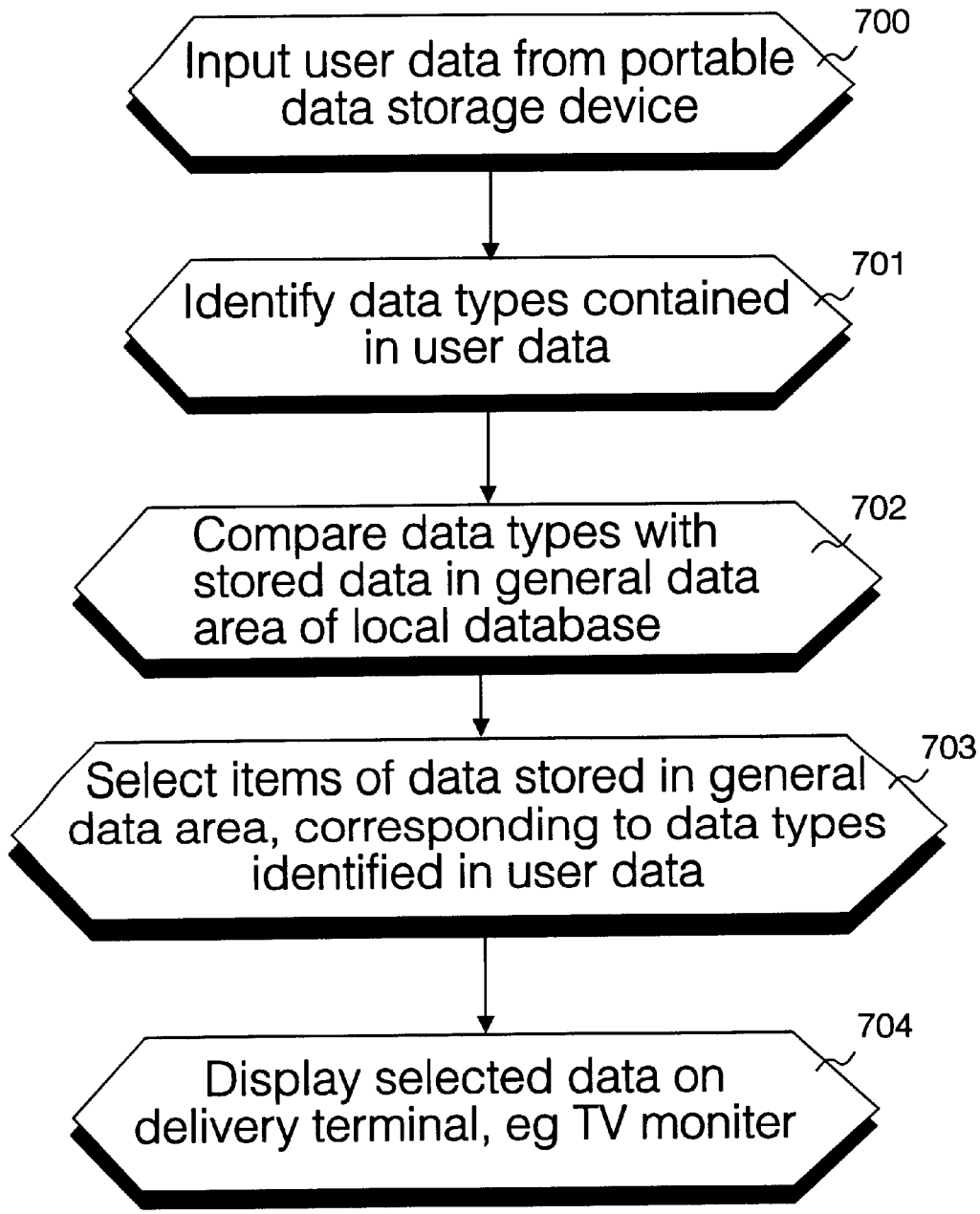
FIG. 7 illustrates a first example of operation of the service terminal device for selecting items of general data stored locally at the service terminal device.
Figure 8:
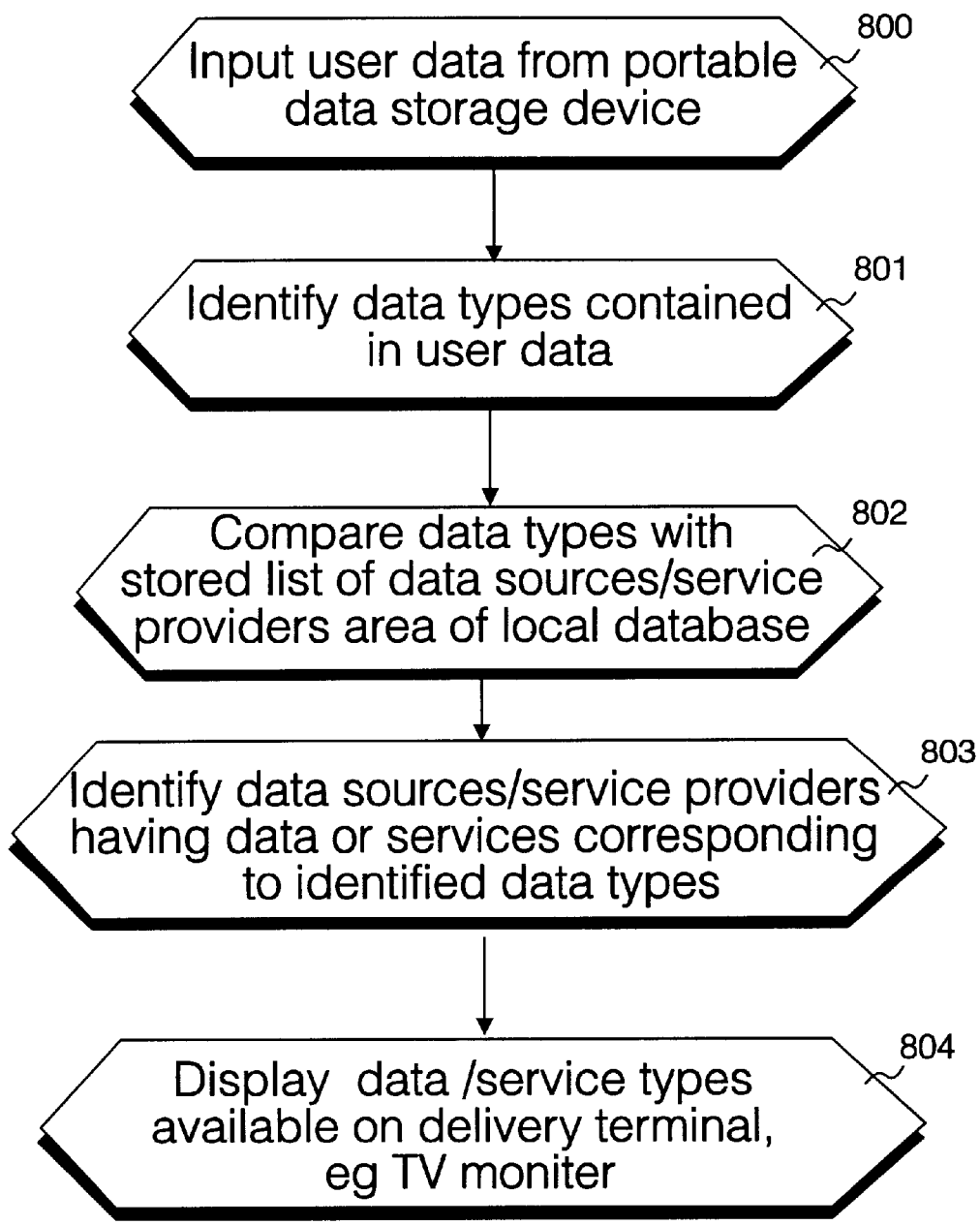
FIG. 8 herein illustrates a second example of operation of the service terminal device for identifying and retrieving data available at a plurality of remote data sources.

Referring to FIG. 5 herein, there is illustrated a data flow between database 400 and the search and display algorithms operated by processor 201. Items of user data 500 are retrieved by user data search algorithm 501, which searches the user data for categories of data, for example data concerning leisure interests, travel interests, etc. The user data search algorithm classifies data types corresponding to the user data, and signals to a general data search algorithm 502 to search general data area 503 of database 400 for data entries contained within general data which correspond to the categories specified in the user data. The general data search algorithm 502 also searches through service data area 504 comprising addresses of data sources and service providers, to retrieve data describing abbreviated information on types of data and services available from the data sources and service providers, addresses of which are stored in the service data 504. The general data search algorithm sends results of the search to the user data search algorithm, or directly to data display algorithm 505 for displaying results of the search of general data and data source/service providers on a user interface related to the user. Users may select data and/or services through the data display and retrieval algorithm 503, which receives a request from a user for data and/or services and can obtain user specified data from the general data area 503 of the database, and/or directly from the data sources and service providers 505.

Referring to FIGS. 1 to 6 herein, there will now be described a general overview of operation of the service terminal facility and its interaction with remote data sources and service providers. In step 600, a user inputs portable data storage medium 109 into the card reader data input port of service terminal 100. Data is downloaded from the portable data storage medium into data storage device 203 of service terminal 100 which stores the user data in a user data area of database 400 in step 601. In step 602, processor 201 operates under control of user data search algorithm 501 to search the stored user data and identify data types specified in the user data. The data types may correspond to personal preferences of information, or any data identified in FIG. 3 or hereinbefore as being user data. In step 603, processor 201 operates under control of general data search algorithm 502 to search general data area 503 of database 400 to identify data items which correspond to data types identified in the user data in step 602. In step 604, identified data items corresponding to data types contained in the user data are retrieved by the processor 201 operating under control of general search algorithm 502. In step 608, retrieved data items are displayed on a user interface corresponding to a room or other location which has been assigned to the user, the assignment being made by way of relationship between a user identifier code or number downloaded from the user data and a room number or location number in database 400. In step 605, processor 201 operating under control of general data search algorithm 502 searches service data area 504 containing data describing remote data sources, to identify possible sources of data and data services which match the data types identified in step 602 in the downloaded user data. In step 606, where remote data sources or remote service providers have been identified having data or services which correspond to the data types found in the user data in step 602, data describing those data sources and service providers may be displayed on the user interface assigned to the user and the user may operate the user interface to retrieve electronic services or data from the identified remote data sources and service providers in step 606. In step 607, data or services may be delivered to the user interface directly from the remote data sources and service providers.

In a further mode of operation, instead of the user specific data being downloaded from the portable data storage medium 109 in step 600, remote access data is in input into the service terminal 100 using the conventional data transfer protocol. The remote access data specifies a location of one or more data sources at which the user specified data may be stored. The service terminal communicates via interface 205, gateway device controller 207 or PBX interface 206 with the remote data sources specified by the remote access data in order to retrieve the user specific data stored on the specified data source. Once the user specific data is retrieved, operation of the service terminal is as described in steps 602–608 onwards.

The smart card may contain a keyword or other verification data necessary for remotely obtaining the user specific data from the remote data source. The keyword may be stored on the smart card, and addressed in step 600. Security of data within the system may be ensured by requirement for a user to type in a password at the service terminal in order to download the remote access data from the smart card to the service terminal. The service terminal may then make the appropriate connections across a communications network, the internet, etc to the remote data source, which may require a keyword or encryption code before the remote data source will release the user specific data. Such a keyword may be stored on the smart card, and may only be operated once the user has typed in his own personal password at the service terminal. The service terminal requires authorization by the stored keyword in order to access data remotely. The keyword is not downloaded to the service terminal, but resides on the smart card. The smart card communicates direct with the remote data source for any communications requiring key word authorization. The level of security required for obtaining user specific data from the remote data source may be specified by the user, and may range from no personal identification numbers or keywords at all, other than the password typed in at the service terminal when the user presents the smart card to the service terminal, up to a "digital electronic signature" system used for transfer of user specific data from the remote data source containing that user specific data to the service terminal, in which transfer of user specific data is verified by a digital signature (a keyword).

At a highest level of security, using a digital electronic signature confirmation of an identity of a caller may be verified using the private or public encryption system as hereinbefore described. Typically, a private encryption system comprises an encryption algorithm and a decryption algorithm, each of which are stored on the key device and at an agent device at the remote data source. The encryption algorithm operates to encrypt data using a keyword signal, for example a personal identification number or sequence of digits or mnemonics which is unique to the user. Both the service terminal and the user's remote data source must use the same keyword to enable encryption and decryption of data. The decryption algorithm decodes the encrypted data using the keyword. On successfully decrypting a signal from the caller, the agent device allows access to the appropriate user specific data. The agent may send the requested user specific data to the service terminal in encrypted form and the decryption algorithm stored on the key device is used to decrypt the data sent by the agent. The decryption algorithm stored in the key device requires knowledge of the keyword in order to decrypt the received encoded data.

In the known public key system, there is provided an encryption algorithm and a decryption algorithm stored both on the key device and at the agent. The public key system uses a public keyword and a private keyword both of which are specific to the caller. For use in electronic signing the caller communicates to the agent via the service terminal using signals which are encrypted using the private keyword, and the agent device decrypts the received signals using the public keyword, and recovers the original encrypted signals, which represents the user's "electronic signature" and identifies with the user. In the public key system all parties must register with a central administration body who controls access to the algorithms and keywords. Electronic signatures are registered to subscribers of the system by the administrating body, who is trusted to ensure that users are identifiable by reference to their keywords.

Referring to FIGS. 1 to 7 herein, there will now be described a process for selecting data from general database area 503 stored locally in data storage device 203 of the service terminal, in accordance with user specified preferences contained in the user data. In step 700, the portable data storage device, eg smart card 109 downloads user data into service terminal 100 using a conventional data transfer protocol. Service terminal 100 identifies data types contained in the user data in step 701, for example data specifying favorite leisure activities such as golf, and searches its internal general information database 503 stored on database 400 for data items relating to the specified leisure activity, eg golf. Such information stored on local information base within database 400 may include addresses and telephone numbers of local golf course and golf ranges, including opening times. In step 703, the service terminal searches the data source/service provider data 504. The general data search algorithm compares the data types identified in the user data stored in general data area 503 and selects data items corresponding to the identified data types. The service terminal retrieves the selected data from the local information base and sends the information to the display device in the user's hotel room, for example TV monitor 102 in step 704.

Referring to FIGS. 1 to 6 and 8 herein, there is described a process of operation of a service terminal for obtaining electronic information services corresponding to data and service types specified in the user data stored on data storage device 203. In step 800, the user inputs the portable data storage device into the card reader data input port 200, and the user data is downloaded and stored in database 400 in the form shown in FIG. 4 herein. The user data may specify specific addresses, for example internet addresses, corporate network addresses or telephone numbers from which data and/or services selected by the user can be accessed. One example of such data may be the telephone number of a corporate telecommunications network within a particular country or locality. In step 801, the service terminal communicates with a data source, via interface 205 by dialing the address data specified in the user data. In step 802, the service terminal may retrieve data or services from the user specified data sources or service providers. In step 803, there are identified data sources/services providers having data or services corresponding to identified data types. In step 804, there is displayed date/service types available on said delivery terminal, e.g. a TV monitor.

Figure 9:
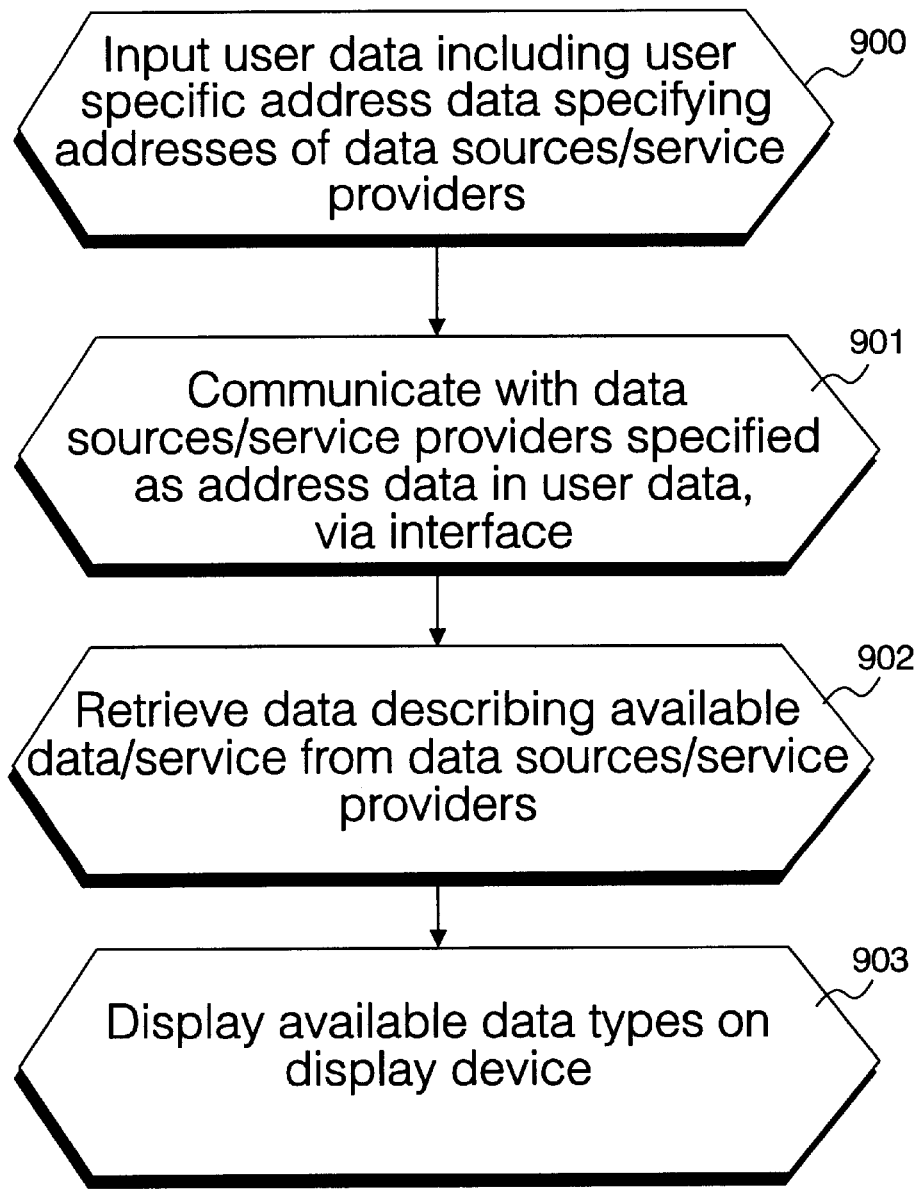
FIG. 9 herein illustrates a third example of operation of the service terminal device for obtaining data and/or services from a plurality of data sources corresponding to data sources identified by user specified data downloaded from the portable data storage medium.

Referring to FIG. 9 herein, as another example, In step 900 user data is input including user specific address data specifying addresses of data sources/service providers in step 901, the service terminal communicates with a data source having an address specified in the user data downloaded from the portable data storage medium. The service terminal may interrogate, over a communications network and via interface 205, the remote service provider or data source, and retrieve a list of available data and/or services from that data source in step 902. The list of available data and/or services may then be stored in the database 400 of the service terminal, and/or may be sent to the display device, eg TV monitor 102 in the guest's hotel room, for display in step 903 to alert the user that such data and/or services are available.

Figure 10:
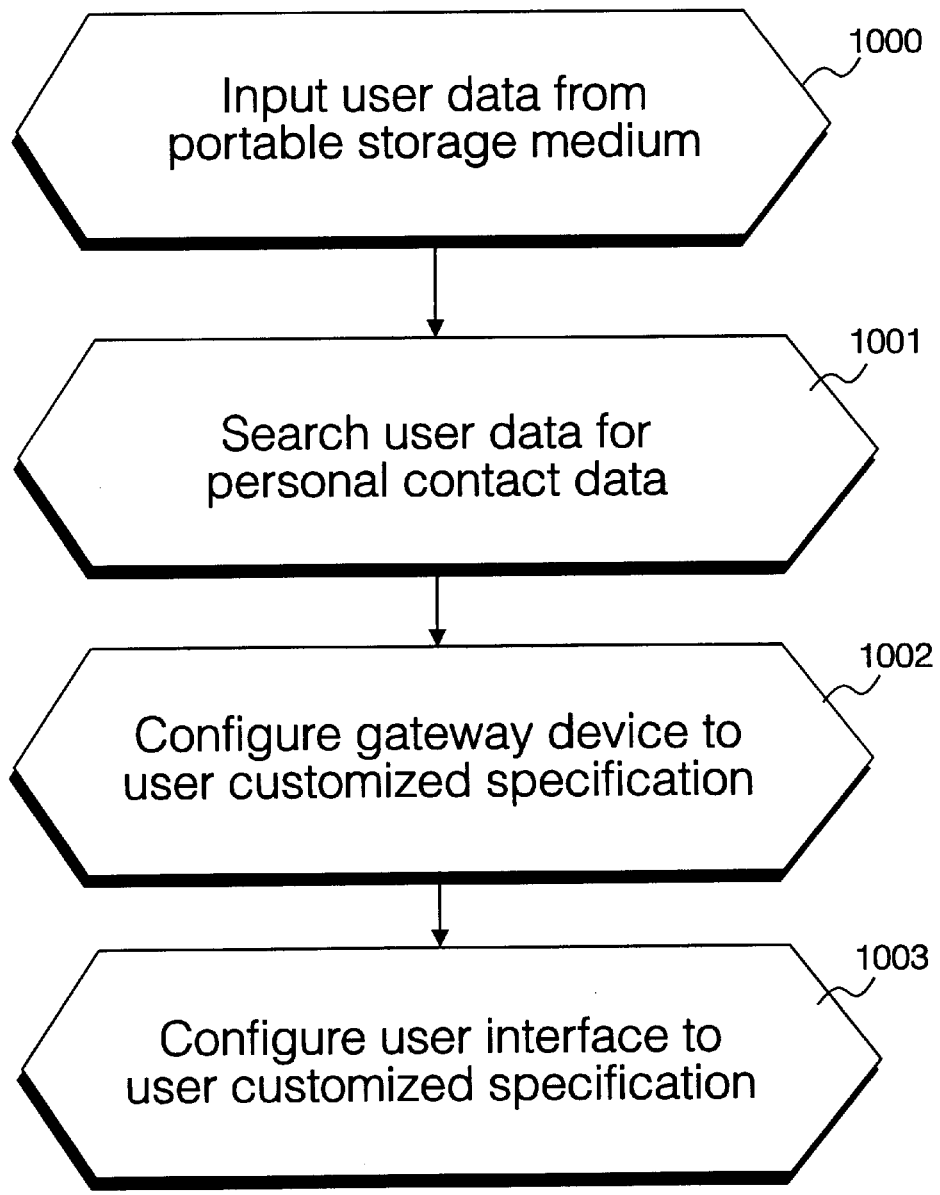
FIG. 10 herein illustrates a fourth example of a mode of operation of the service terminal device for customizing one or more user interfaces with personalized services specific to a user.

Referring to FIG. 10 herein, there is exemplified a mode of operation whereby the user interface is personalized according to a user preference. In step 1000, the user data is input into data input port 200 of the service terminal. In step 1001, the processor 200 searches the user data for personal contact data contained within the user data. Such personal contact data may include telephone numbers of personal contacts, e-mail addresses of personal contacts or the like. In step 1002, the gateway device is configured to user customized specification. In step 1003, the service terminal configures one or more user interfaces, for example a telephone handset, or a general purpose personal computer, to communicate directly with the telephone numbers and/or addresses specified in the personal contact data of the user data.

For example, where a telephone number or a corporate telecommunications network is specified in the user data, the service terminal may connect a local service facility, for example the PBX of the hotel, to that local corporate network, and may internally configure the PBX such that a telephone handset within the guest's hotel room is configured to automatically dial the specified address of the corporate network, whenever outside calls are required. This may have an advantage that when a user is in a foreign territory and wishes to communicate with his home country, rather than use an international telephone network, incurring international telephone network billing rates, the user may make a local call to a corporate telecommunications network to which he has access, thereby incurring only the costs of a local call, and thereafter communicate with persons within the corporate network at local rate, even though the user is corresponding with persons in foreign territories.

In addition to providing personalized electronic data services for delivery to a user at a user interface assigned to the user by the hotel, the service terminal facility may be used to streamline the check-in process at the hotel, and provide the hotel with contact information on the user in case of illness or accident. The downloaded user data contains data describing information concerning the user's home telephone contact numbers, medical information such as blood group, whether an organ donor, details of home address and citizenship, car registration number, and other such details as may normally be required on checking into a hotel. Downloading the information from the portable data storage medium 109 may replace filling in forms on checking into the hotel. The downloaded user data may be password protected, allowing the operators of the service terminal, ie hotel employees, access to general details about the user, whilst maintaining the user's personal preference data contained within the user data in a confidential area when downloaded into database 400.

What is claimed is:

1. A service apparatus capable of providing personalized electronic data services specific to a user, said service apparatus comprising:

at least one portable data storage means capable of specifying user specific data describing a set of data types personalized to a user;

data input means for receiving said user specific data;

data storage means for storing data describing a plurality of said electronic data services;

means for selecting at least one said electronic data service, said selection being made in accordance with said user specific data by comparing said user specific data with said data describing electronic data services; and means for controlling delivery of said selected electronic data services, wherein said portable data storage means downloads said user specific data to said data input means, and said user specific data is used to configure said means for selecting at least one electronic data service and said means for controlling delivery of said selected electronic data services to provide services selected in accordance with said user specific data.

2. The service apparatus as claimed in claim 1, wherein said means for controlling delivery of electronic data services is capable of controlling at least one user interface.

3. The service apparatus as claimed in claim 1, wherein said means for controlling delivery of electronic data comprises means for controlling a private branch exchange apparatus.

4. The service apparatus as claimed in claim 3, wherein said private branch exchange apparatus is configurable in response to control signals generated by said control means, in response to said user specific data, to store a plurality of abbreviated dial numbers.

5. The service apparatus as claimed in claim 1, wherein said data input means comprises a smart card reader port.

6. The service apparatus as claimed in claim 1, wherein said means for selecting electronic data services comprises a processor operating in accordance with a search algorithm, said algorithm operating to compare said user data with said stored data describing said plurality of electronic data services.

7. The service facility as claimed in claim 1, wherein said means for controlling delivery of selected electronic data services comprises interface means capable of communicating with a plurality of remote data sources.

* * * * *